3,120,484
Patented Feb. 4, 1964

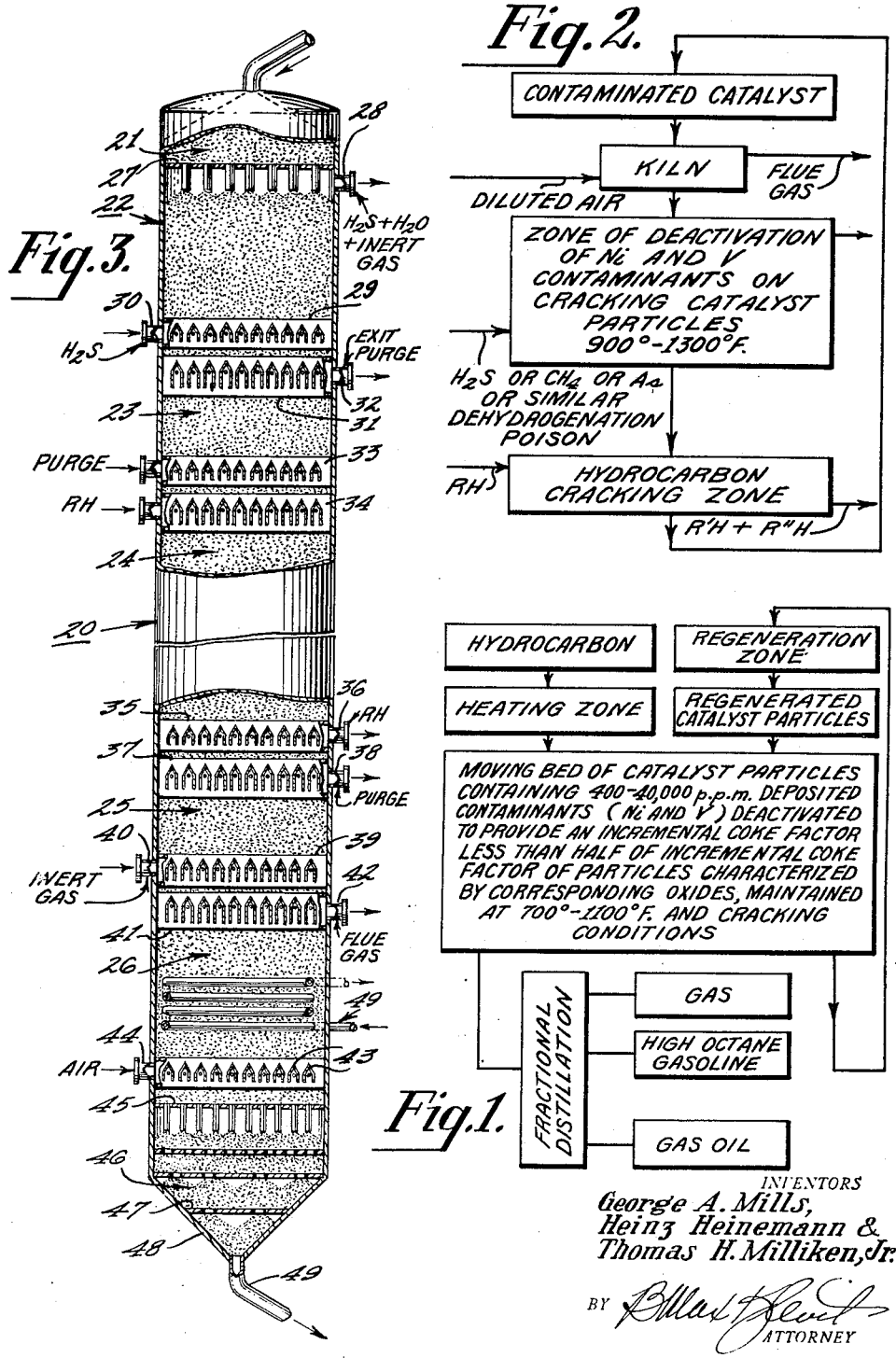

3,120,484
REACTIVATING METALLIC CONTAMINATED CATALYST EMPLOYED IN CRACKING HYDROCARBONS
George Alexander Mills, Swarthmore, Thomas H. Milliken, Jr., Rose Valley, and Heinz Heinemann, Swarthmore, Pa., assignors to Air Products and Chemicals, Inc., a corporation of Delaware
Original application June 15, 1954, Ser. No. 436,814. Divided and this application June 29, 1959, Ser. No. 824,153
1 Claim. (Cl. 208—120)

This invention relates to the cracking of hydrocarbons and particularly to the cracking of hydrocarbons over solid catalysts contaminated by heavy metals of the group consisting of vanadium and nickel. This application is a division of Serial No. 436,814, filed June 15, 1954.

As explained in an article by G. A. Mills, Industrial and Engineering Chemistry, vol. 42, page 182 (1950), deposited contaminants of the group comprising vanadium and nickel on a catalytic cracking catalyst, contribute to the loss of catalyst activity or selectivity. Hydrocarbons in the presence of materials such as vanadium, nickel, vanadium oxide, and nickel oxide at elevated temperatures, such as encountered in a cracking zone, tend to form carbonaceous deposits. Hence such materials can be designated as coking catalysts. This coke forming tendency of heavy metal oxides is related in part to the dehydrogenation activity of the heavy metal oxides. The carbonaceous deposits result in part from the polymerization of the unsaturates resulting from the dehydrogenation of hydrocarbons by the catalytic influence of vanadium oxide and nickel oxide.

Throughout the industrial history of catalytic cracking, much attention has been given to the problems connected with the effect of heavy metals and heavy metal oxides on the products distribution and other aspects of the catalytic cracking operations. Some deposited contaminants, such as strontium and barium are so rarely encountered that they can be ignored. Some metals such as iron are encountered much more frequently than contaminants such as strontium. The troubles attributable to a given concentration of a contaminant such as iron are of a smaller order of magnitude than those arising from the same concentration of contaminants of the group consisting of vanadium and nickel materials. Catalysts are conveniently considered merely on the basis of their content of vanadium and nickel contaminants without regard to the amount of iron or other deposited contaminants. Copper oxide, although only rarely encountered in crudes, and then usually in combination with vanadium, is sometimes deposited on catalysts from equipment. Copper oxide adversely increases the incremental coke factor even more than the same weight of ferric oxide, but requires no separate consideration because of the infrequency of copper difficulty except in combination with vanadium and/or nickel contaminants.

Partly because heavy metal contaminants have accumulated on catalysts, it has generally been the practice to replace a catalyst after use for a period of months in a fixed bed operation. In those catalytic cracking installations having a zone of moving particles of catalyst (e.g. gravitating beads or fluidized catalyst), it has been customary to replace constantly a small fraction of the total amount of catalyst in circulation. Accordingly, the useful life of the catalyst in a system having a zone of moving particles has been discussed in terms of the catalyst replacement rate. It has been known that the catalyst replacement rates were significantly smaller during the processing of a gas oil distillate containing only small amount (for example, 0.1 part per million) of heavy metals than in the processing of gas oils containing relatively large (for example, about 1 or 2 p.p.m.) of heavy metals. It has been known that solid catalyst particles were susceptible to "abnormal aging" involving high rates of catalyst replacement as a result of excessively large amounts of heavy metals in the hydrocarbons subjected to cracking. Some petroleum distillates (i.e. gas oils) boiling above the range of gasoline have had no ash content, and others have had up to about 50 p.p.m. heavy metals.

Even during the processing of gas oils containing very small amounts of heavy metals, it has been possible for the catalyst to become contaminated with heavy metals by reason of impurities introduced through the process equipment and/or by accident. It has been necessary to replace the thus contaminated catalyst because of its abnormal aging even though the heavy metal content of the catalyst was not attributable to the stock being processed.

Although catalyst particles containing excessive amounts of contaminants of the group consisting of vanadium and nickel have not been suitable for use in the cracking zone, it has been feasible to tolerate small amounts of such contaminants. The catalyst withdrawn from a circulating catalyst installation has sometimes contained a significant amount of vanadium and nickel, such as about 20 p.p.m. Heretofore it has generally been considered not commercially feasible to employ as a cracking catalyst a solid containing more than about 200 p.p.m. of deposited contaminants of the group consisting of vanadium and nickel.

The vanadium and nickel content of catalyst particles comprising activated (i.e. not deactivated) contaminants leaving the de-coking kiln or oxidation zone (or entering the cracking zone) is in the form of vanadium oxide and nickel oxide. Chemical analyses are based on the amounts of vanadium oxide and nickel oxide found in the particles. The concentrations of contaminants in parts per million also refer to vanadium oxide and nickel oxide. During the passage of vanadium oxide and/or nickel oxide through a hydrocarbon cracking zone, it is conceivable that a part thereof may be reduced to the metallic state. The presence of metallic vanadium and/or nickel may contribute to the adverse result of a high incremental coke factor. Regardless of the extent, if any, of such metal formation, within the cracking zone, catalyst particles entering the cracking zone with vanadium oxide and/or nickel oxide contaminants possess a high incremental coke factor which is a consistent and reliable standard of comparison in evaluating catalysts.

In the cracking zone, a significant portion of the heavy metal content of a hydrocarbon charge tends to be deposited on the solid catalyst. Accordingly, the effect of the heavy metals in the charge stock is cumulative as it affects the catalyst.

If a stock containing a relatively large amount, for example 2 p.p.m., of heavy metals, is cracked by conventional procedures, the catalyst can be employed for only a relatively few cycles before accumulating a heavy metals contaminant deposition greater than about 200 p.p.m.

A residuum stock has been considered generally unsuitable for catalytic cracking, by reason of the large amount of heavy metals in this type of hydrocarbon stock. A crude having an ash of 500 p.p.m. yields a 10% bottoms containing about 5000 p.p.m. metals. Even a crude containing 0.1 p.p.m. ash yields a 10% bottoms of 1 p.p.m. metals. Although petroleum fractions containing large amounts (e.g. 2 p.p.m. of heavy metals) have been thermally cracked, commercial cracking of high metals stock over conventional catalysts by conventional procedures has not been industrially practical. In the application of George Alexander Mills, Thomas H. Milliken, Jr., and Donald H. Stevenson, Serial No. 421,226, filed April 6, 1954, for "Cracking of Heavy Hydrocarbons," and assigned to the same assignee as herein, a practical method of cracking topped crudes and/or residua in the presence of controlled quantities of steam has been described recently. Certain embodiments of the present invention are useful as a supplement to the method of cracking heavy hydrocarbons described in said application.

In accordance with the present invention, a hydrocarbon charge stock, whether of the gas oil or residuum type, but having at least some components boiling above the range of light gasoline, is heated to an elevated temperature and thereafter introduced into a circulating stream (e.g. gravitating bed or fluidized zone) of solid particles of cracking catalyst. It should be especially noted that the particles of cracking catalyst contain more than 400 but less than 40,000 parts per million of deposited contaminants of the group consisting of vanadium and nickel, said contaminants being deactivated to provide an incremental coke factor less than one-half the incremental coke factor attributable to the particles characterized by the corresponding quantities of the corresponding oxides of vanadium and nickel. The hydrocarbon is subjected to cracking conditions including a temperature within the range from about 700 to about 1100° F. during the conversion over the catalyst comprising the deactivated heavy metal contaminants. A vapor stream is withdrawn from the cracking zone and the hydrocarbon products therein are subjected to fractional distillation, thereby obtaining a fraction constituting a high octane gasoline. A gas stream, gas oil, and bottoms or mixtures thereof are also recovered. The particles of cracking catalyst are withdrawn from the cracking zone and are moved to an oxygen containing zone, in which the coke deposited on the particles is burned. The decoked catalyst particles are recirculated to the cracking zone.

The vanadium and/or nickel contaminants are deactivated by means of a deactivating agent which may be introduced during catalyst manufacture, during the passage of the particles through the cracking zone, and/or during a special processing step subsequently to the decoking of the catalyst particles and prior to the return of the catalyst particles to the cracking zone. The deactivating agent may combine with the vanadium and/or nickel contaminants in a chemical or quasi-chemical manner, or the deactivation may be of a more strictly physical nature.

A carbonaceous deposit can be formed substantially only upon heavy metal contaminants by preliminary treatment with a normally gaseous hydrocarbon under dehydrogenation conditions, whereby a particular kind of active carbon forms at the sites of the vanadium and/or nickel contaminants, but not at the sites of cracking activity.

According to important embodiments of the invention the deactivating agent is introduced in a deactivating zone between the decoking zone and hydrocarbon conversion zone.

Certain features characterize that embodiment of the present invention in which the vanadium and nickel contaminants on a catalyst particle are deactivated by the formation thereon of an active carbon. A hydrocarbon gas containing not more than four carbon atoms, and selected from the group consisting of methane, ethane, ethylene, propane, propylene, butane, butylene, butadiene, and mixtures thereof, and conveniently designated as a hydrocarbon gas having a molecular weight less than 60 or as a normally gaseous hydrocarbon, is passed over the decoked catalyst particles at an elevated temperature within the range from 900 to 1300° F. Metal oxides such as vanadium oxide and nickel oxide are effective in bringing about some deposition of active carbon at the location of the metal deposits. However, the major portion of the active catalytic surface of the catalyst particles is quite unaffected by the hydrocarbon gas under these deactivation conditions.

Although various deactivating agents and/or techniques or combinations of techniques for deactivating vanadium and nickel contaminant deposits are suggested herein, other deactivating agents and/or methods can be utilized for achieving such deactivation without departing from the present invention, which concerns the cracking of hydrocarbons in the presence of cracking catalysts comprising deactivated heavy metal contaminants of the group consisting of vanadium and nickel.

The data relating to catalytic cracking is best understood in connection with the results of a "Cat. A" test. The standard test for the usefulness of a cracking catalyst, sometimes designated as the Cat-A test, described in an article by Alexander, Proceedings American Petroleum Institute (III), 27, page 57 (1947), is utilized in several of the examples. It should be noted that the gas gravity (which is desirably above 1.00) is one of the useful guides in detecting the adverse effects of deposited contaminants. Still more useful, however, are data on the coke factors and incremental coke factors as derived from the Cat. A tests. The coke factor is the ratio of coke produced under test conditions to the coke produced under standard conditions so controlled as to achieve the same yield of gasoline.

As explained in an article, entitled "Factors Controlling Aging of Cracking catalysts," by G. A. Mills and H. A. Shabaker, Petroleum Refiner, 30, page 97, graphs (e.g. FIG. 7 of said article) are sometimes useful in presenting the data relating to the standard of comparison in calculating coke factors from the experimental data.

Because a coke factor of 1.00 represents what was initially expected to be the optimum, and because a coke factor of 3.00 is actually at least twice as disadvantageous as a coke factor of 2.00, it has been helpful to employ the term "incremental coke factor" which mathematically is one less than the coke factor (e.g. coke factors of 1, 3 and 2 correspond to incremental coke factors of 0, 2 and 1 respectively). Thus the incremental coke factor provides a useful criteria concerning the adverse coke-forming tendencies of a catalyst under the standard testing conditions. An incremental coke factor of 2.00, for example, indicates adverse coking at least four times as severe as an incremental coke factor of 0.5.

Using gas oils entirely free from heavy metals, and fresh uncontaminated catalysts, the yield of gasoline can be regulated by controlling the cracking conditions. The amount of coke formed is dependent upon the severity of cracking conditions and/or gasoline yield. If only 20% gasoline is obtained, the coke is about 0.7% of the feed, but if 40% gasoline results, approximately 3% of the feed forms coke even under optimum conditions. The amount of coke formed under optimum conditions provides a standard of comparison under adverse conditions. The "coke factor" is a term well established in catalytic cracking technology to express the ratio of the coke formed to the coke which would have been formed under such optimum conditions at the same yield of gasoline. Under mild cracking conditions resulting in 20% gasoline, if the coke was 2.1% of the feed, the coke factor might be 3.0, whereas the production of 4.5% coke might provide a coke factor of only 1.5 if the gasoline production was 40%.

In the accompanying drawings FIGURE 1 is a schematic representation of a flow sheet of the method of the present invention. One group of the several groups of embodiments of the invention is schematically represented in flow sheet of FIGURE 2. FIGURE 3 is a schematic representation of an apparatus shown partly in cross section, said apparatus being suitable for conducting an embodiment of the method of FIGURE 2.

Reference is made to several examples which illustrate prior art practices, controls, and embodiments of the invention.

Example I

A clay catalyst was impregnated to contain about 450 p.p.m. of nickel as nickel oxide. This catalyst was tested with a standard gas oil under standard cracking conditions. The relatively unsatisfactory performance of this catalyst was attributable almost entirely to the presence of the deposited nickel contaminant.

This contaminated catalyst was subjected to a stream of methane at a gaseous hourly space rate of 30 v./v. hour. The catalyst particles and gas were both preheated to maintain a temperature of 1100° F. in the deactivating chamber. There was thus produced on the catalyst particles 0.06% active carbon, which active carbon was deposited only on those portions where nickel oxide was present. The nickel was deactivated by the coating of active carbon to provide an incremental coke factor about four-tenths that of the contaminated catalyst. In the standard cracking tests the following results were noted:

|  | Initial Clay | Contaminated with Ni | Deactivated by Carbon |
|---|---|---|---|
| Gasoline, percent | 28.4 | 18.2 | 20 |
| Gas, percent | 3.4 | 3.8 | 3.6 |
| Coke, percent | 1.7 | 3.9 | 2.5 |
| Gas Gravity | 1.19 | 0.44 | 0.55 |
| Coke Factor | 1.2 | 4.3 | 2.28 |
| Incremental Coke Factor | 0.2 | 3.3 | 1.28 |
| Percentage Decrease |  |  | 61.3 |

It should be noted that the presence of the active carbon on the catalyst particles made it possible to produce a larger amount of gasoline and a significantly smaller amount of coke.

Example II

The nickel contaminated catalyst particles of the previous example were treated with butane gas at 1100° F. at an hourly space rate of 30 v./v. hour to form an active carbon deposit on the nickel contaminated portions of the catalyst particles. On analysis, the particles were found to contain 0.2% active carbon.

The catalyst particles after deactivation with butane were employed in the standard cracking test and found to have an incremental coke factor with the following results:

|  | Initial Clay | Contaminated with Nickel | Deactivated by Carbon from Butane |
|---|---|---|---|
| Gasoline, percent | 28.4 | 18.2 | 21.5 |
| Gas, percent | 3.4 | 3.8 | 3.8 |
| Coke, percent | 1.7 | 3.9 | 2.9 |
| Gas Gravity | 1.19 | 0.44 | 0.71 |
| Coke Factor | 1.20 | 4.30 | 1.75 |
| Incremental Coke Factor | 0.20 | 3.30 | 0.75 |
| Percentage Decrease |  |  | 77.4 |

Thus the deactivation of the nickel oxide by butane further increased the production of gasoline and significantly decreased the amount of coke formed, as compared to the amount formed without butane deactivation.

Inasmuch as the reaction of low molecular weight (i.e. less than 60) hydrocarbons and oxides of metals such as vanadium and nickel is very rapid, it is appropriate to utilize the gas lift as the deactivation chamber when employing said low molecular weight hydrocarbons (also designated as normally gaseous hydrocarbons) as the deactivating agent. Although an average-sized catalyst bead may travel from the bottom to the top of a gas lift in a very short time, the metallic oxide deposits on the catalyst can be coated with a sufficient film of carbon at these elevated temperatures even during the brief passage of each particle through the gas lift.

The type of carbon deposited on the catalyst particles by the reaction of the low molecular weight hydrocarbon with the metallic oxide may be different from that which results from the deposition of carbonaceous material during the cracking of liquid hydrocarbons. Such different properties are most easily described by the term "activate carbon" to distinguish the carbon of the deactivated particles from the carbonaceous deposits or coke resulting from ordinary catalytic cracking operations. The solid deposit from the reaction of a hydrocarbon gas of less than 60 molecular weight may have a smaller particle size, smaller hydrogen content, less volatilizable matter, and larger adsorptive surface than the carbonaceous material deposited during conventional cracking.

The differences in the location of the carbon-containing deposits on the catalyst particles is even more important than the differences in the composition of the deposits. At temperatures employed in the activate carbon deposition, the silica-alumina catalyst is substantially insert as regards normally gaseous hydrocarbons. Although the oxides of vanadium and nickel exert their catalytic influence on the normally gaseous hydrocarbon, thereby depositing the active carbon only at the sites of the heavy metal contaminant, the cracking catalyst exerts no cracking influence on the normally gaseous hydrocarbons at the conditions employed for such deactivation. Accordingly the carbon deposition at the metal contaminant sites does not interfere with the cracking activity of the catalyst.

What is claimed is:

In a method for continuously cracking metal contaminated hydrocarbons which are liquid above 400° F. in which silica-alumina cracking catalyst granules are circulated through a hydrocarbon cracking zone and through a regeneration zone and are continuously recirculated through the cracking and regeneration zones with incremental amounts of fresh silica-alumina cracking catalyst granules added at a rate maintaining the average catalytic effectiveness at an acceptable level, and in which the silica-alumina cracking catalyst granules contain an average concentration of more than 400 but less than 40,000 p.p.m. of heavy metal contaminants of the group consisting of vanadium and nickel, said deposited heavy metal contaminants and nickel, said deposited heavy metal contaminants having been deposited from previous hydrocarbon charge containing compounds of vanadium and nickel as contaminants, the improvement which consists essentially of: directing regenerated silica-alumina cracking catalyst granules having an average concentration of more than 400 but less than 40,000 p.p.m. of heavy metal contaminants of the group consisting of vanadium and nickel into a deactivating zone maintained at a temperature of about 1100° F.; depositing carbon selectively on to the contaminants by subjecting the catalyst granules at 1100° F. to a stream of butane; and directing the granules characterized by carbon selectively deposited on vanadium and nickel contaminants into the cracking zone, whereby the amount of carbonaceous deposit formed in the zone for cracking the hydrocarbons which are liquid above 400° F. is so small that the incremental coke factor is less than ½ the incremental coke factor of granules characterized by corresponding quantities of a catalytically active form of the oxides of vanadium and nickel, and whereby the catalyst replacement rate is significantly less than in the absence of said butane treatment of the regenerated catalyst.

References Cited in the file of this patent

UNITED STATES PATENTS

| 2,300,151 | Hemminger | Oct. 27, 1942 |
| 2,366,372 | Voorhees | Jan. 2, 1945 |
| 2,408,943 | Mekler | Oct. 8, 1946 |
| 2,683,683 | Mills | July 13, 1954 |

UNITED STATES PATENT OFFICE
CERTIFICATE OF CORRECTION

Patent No. 3,120,484                                              February 4, 1964

George Alexander Mills et al.

It is hereby certified that error appears in the above numbered patent requiring correction and that the said Letters Patent should read as corrected below.

Column 6, line 20, for "insert" read -- inert --.

Signed and sealed this 14th day of July 1964.

(SEAL)

Attest:

ESTON G. JOHNSON                                         EDWARD J. BRENNER
Attesting Officer                                              Commissioner of Patents